(12) United States Patent
Wang

(10) Patent No.: US 9,108,778 B2
(45) Date of Patent: Aug. 18, 2015

(54) COVER STRUCTURE FOR AN AIRTIGHT CONTAINER

(71) Applicant: Jui-Te Wang, Taichung (TW)

(72) Inventor: Jui-Te Wang, Taichung (TW)

(73) Assignees: Jui-Te Wang, Taichung (TW); Jordan S. Tarlow, Taichung (TW)

( * ) Notice: Subject to any disclaimer, the term of this patent is extended or adjusted under 35 U.S.C. 154(b) by 132 days.

(21) Appl. No.: 13/934,195

(22) Filed: Jul. 2, 2013

(65) Prior Publication Data

US 2015/0008219 A1    Jan. 8, 2015

(51) Int. Cl.
    *B65D 51/16*     (2006.01)
    *F16K 17/19*     (2006.01)

(52) U.S. Cl.
    CPC .......... *B65D 51/165* (2013.01); *B65D 51/1644* (2013.01); *F16K 17/19* (2013.01)

(58) Field of Classification Search
    CPC .......... B65D 51/1644; B65D 51/1683; B65D 81/20; B65D 81/2038; B65D 81/263; A47G 19/2272; F16K 17/19
    USPC ............... 215/260, 262, 309–311; 220/203.01–203.02, 203.11–203.29, 220/231, 367.1
    See application file for complete search history.

(56) References Cited

U.S. PATENT DOCUMENTS

| | | | |
|---|---|---|---|
| 3,943,987 A * | 3/1976 | Rossi | 206/524.8 |
| 3,974,936 A * | 8/1976 | Gerdes | 220/203.02 |
| 4,036,399 A * | 7/1977 | Gerdes | 220/303 |
| 4,051,971 A * | 10/1977 | Saleri et al. | 215/260 |
| 4,337,873 A * | 7/1982 | Johnson | 220/203.02 |
| 5,019,345 A * | 5/1991 | Lorenz | 220/203.02 |
| 5,079,013 A * | 1/1992 | Belanger | 215/11.4 |
| 5,397,024 A * | 3/1995 | Wu et al. | 220/231 |
| 5,406,992 A * | 4/1995 | Miramon | 141/65 |
| 5,950,857 A * | 9/1999 | Rosen | 220/23.91 |
| 6,161,716 A * | 12/2000 | Oberhofer et al. | 220/203.04 |
| 6,644,489 B2 * | 11/2003 | Chang | 220/203.01 |
| 2006/0138068 A1 * | 6/2006 | Tsai et al. | 215/228 |
| 2007/0007163 A1 * | 1/2007 | Schlattl et al. | 206/543 |
| 2007/0205194 A1 * | 9/2007 | Tung | 220/203.15 |
| 2008/0110911 A1 * | 5/2008 | Chen | 220/788 |
| 2008/0217335 A1 * | 9/2008 | Chen | 220/231 |
| 2010/0084396 A1 * | 4/2010 | Wu | 220/203.29 |
| 2010/0263328 A1 * | 10/2010 | Dorsey et al. | 220/203.29 |
| 2010/0264141 A1 * | 10/2010 | Tarlow et al. | 220/203.01 |
| 2012/0125936 A1 * | 5/2012 | Byers | 220/371 |
| 2012/0248110 A1 * | 10/2012 | Wu | 220/203.21 |
| 2012/0267369 A1 * | 10/2012 | Duvigneau | 220/203.01 |

* cited by examiner

*Primary Examiner* — Bryon Gehman
*Assistant Examiner* — Brijesh V. Patel

(57) ABSTRACT

An airtight container includes a cover, a container and two airtight members. The cover is assembled with the container. The cover has an exhaust part and a releasing part defined therein. The two airtight members are mounted in the exhaust part and the releasing part of the cover respectively. Each airtight member having an inlet and an air gap defined at two ends thereof respectively. The air gap communicates with the inlet. The inlet of one airtight member opened toward an inside of the container and the air gap opened toward an outside of the container, the inlet of another airtight member opened toward the outside of the container and the air gap opened toward the inside of the container. Therefore, the container could be sealed or unsealed by pressing the cover to the container or detaching the cover from the container.

2 Claims, 14 Drawing Sheets

COVER STRUCTURE FOR AN AIRTIGHT CONTAINER

BACKGROUND OF THE INVENTION

1. Field of the Invention

The present invention relates to an airtight container and more particularly to a cover structure for an airtight container.

2. Description of Related Art

Generally, airtight storage containers are containers (bottles, jugs, vessels) that have lids to seal them and not allowing air to get in or out. These containers are for storage purposes and mostly for food. They are important because they help extend the lifespan of food.

A conventional airtight container has a container, a cover and a coupling device. The cover is provided to seal the container. The cover has a sealing member disposed at one side thereof. The sealing member is made of soft plastics and the cover is coupled to the container via the coupling device so that the container is sealed.

However, the conventional airtight container has a disadvantage shown as following:

The cover structure of the conventional airtight container cannot discharge extra air inside the container, so that the conventional airtight container needs additional coupling device to couple the cover and the container together.

The present invention has arisen to mitigate and/or obviate the disadvantages of the conventional airtight container.

SUMMARY OF THE INVENTION

The main objective of the present invention is to provide an improved airtight container.

To achieve the objective, an airtight container comprises a cover, a container and two airtight members, the cover assembled with the container, the cover having an exhaust part and a releasing part defined therein, the two airtight members mounted in the exhaust part and the releasing part of the cover respectively, each airtight member having an inlet and an air gap defined at two ends thereof respectively, the air gap communicating with the inlet, the inlet of one airtight member opened toward an inside of the container and the air gap opened toward an outside of the container, the inlet of another airtight member opened toward the outside of the container and the air gap opened toward the inside of the container. Wherein each airtight member has a cylindrical portion and a head portion connected with the cylindrical portion; the inlet is defined in the cylindrical portion, and the air gap is defined in the head portion; the exhaust part and the releasing part of the cover both have an assembling hole defined therethrough; the two airtight member are assembled in the assembling hole of the exhaust part and the assembling hole of the releasing part respectively; the assembling hole has a positioning protrusion defined at an inner periphery thereof; each airtight member has an insertion groove defined at an outer periphery of the cylindrical portion thereof; the insertion groove of each airtight member corresponds to the positioning protrusion of the assembling hole so that each airtight member is positioned in the assembling hole; each airtight member has an annular portion defined around one end of the cylindrical portion of each airtight member; each airtight member has at least one sealing ring protruded from an outer periphery of the cylindrical portion thereof; the sealing ring of each airtight member is flexibly abutted against an inner periphery of the respective assembling hole; the head portion of each airtight member is gradually tapered from the cylindrical portion toward a terminal end thereof; an opening size of the inlet is larger than an opening size of the air gap of each airtight member.

Another airtight container comprises a cover, a container and an airtight member, the cover assembled with the container, the cover having an assembling hole defined therethrough, the airtight member assembled in the assembling hole, the airtight member having an exhaust portion and a releasing portion arranged in parallel, the exhaust portion having a first inlet and a first air gap defined at two ends thereof respectively, the first air gap communicating with the first inlet, the releasing portion having a second inlet and a second air gap defined at two ends thereof respectively, the second air gap communicating with the second inlet, the first inlet opened toward an inside of the container and the second inlet opened toward an outside of the container. Wherein the airtight member has a cylindrical portion and two head portions respectively connected with two ends of the cylindrical portion; the first inlet and the second inlet are disposed at opposite sides of the cylindrical portion respectively; the first inlet and the second inlet are adjacent to the two head portions respectively; the first air gap and the second air gap are disposed at two head portions respectively; each head potion of the airtight member is gradually tapered from the cylindrical portion toward a terminal end thereof; an opening size of the first inlet is larger than an opening size of the first air gap of the exhaust portion, and an opening size of the second inlet is larger than an opening size of the second air gap of the releasing portion; the assembling hole has a positioning protrusion protruded from an inner periphery thereof; the airtight member has an insertion groove defined at an outer periphery of the cylindrical portion of the airtight member; the insertion groove of the airtight member corresponds to the positioning protrusion of the assembling hole so that the airtight member is positioned in the assembling hole; the airtight member has a partition wall defined between the exhaust portion and the releasing portion of the airtight member so as to separate the exhaust portion and the releasing portion.

Further benefits and advantages of the present invention will become apparent after a careful reading of the detailed description with appropriate reference to the accompanying drawings.

DETAILED DESCRIPTION OF THE INVENTION

Figure 1:
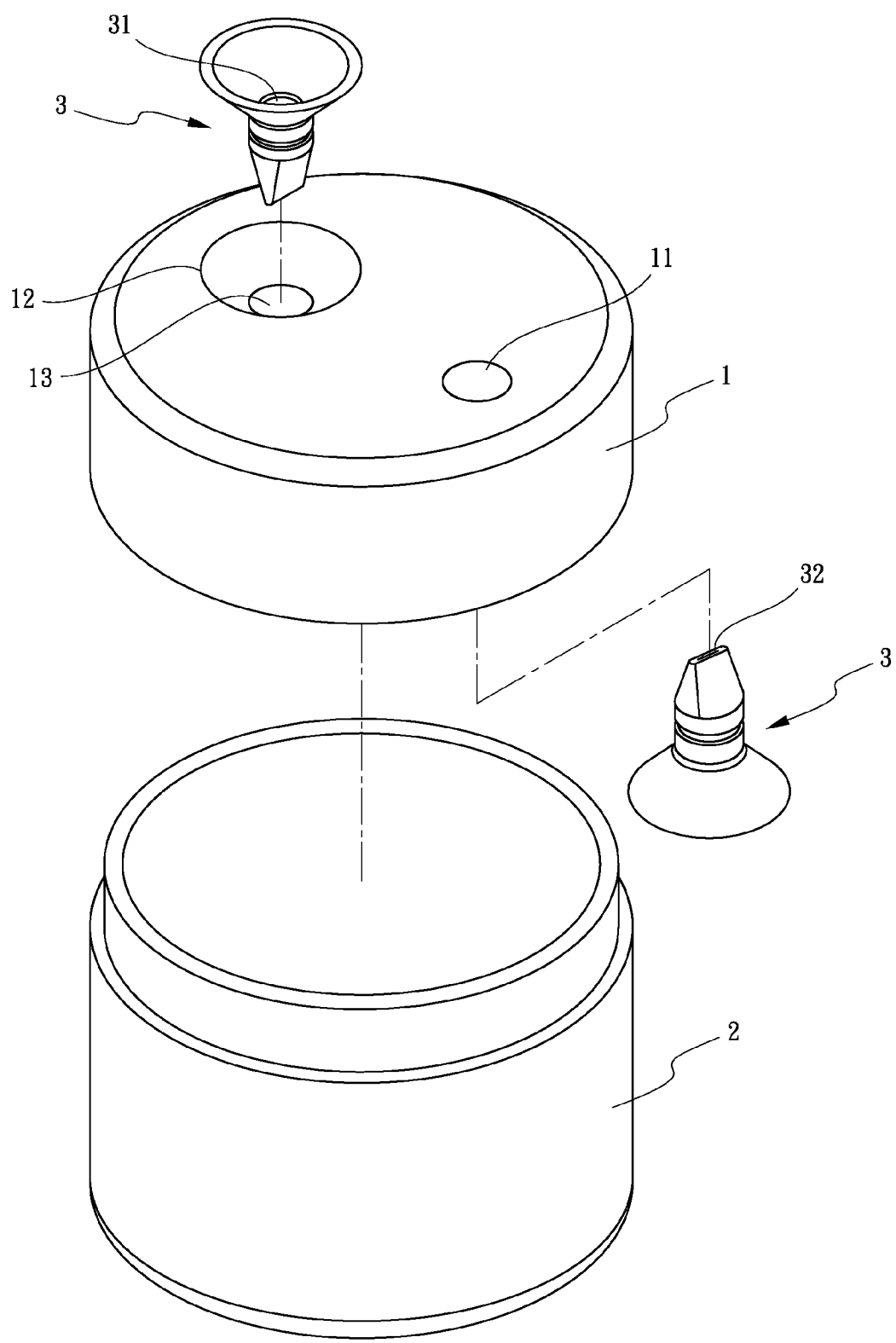
FIG. 1 is an exploded perspective view of an airtight container according to a first embodiment of the present invention.
Figure 2:
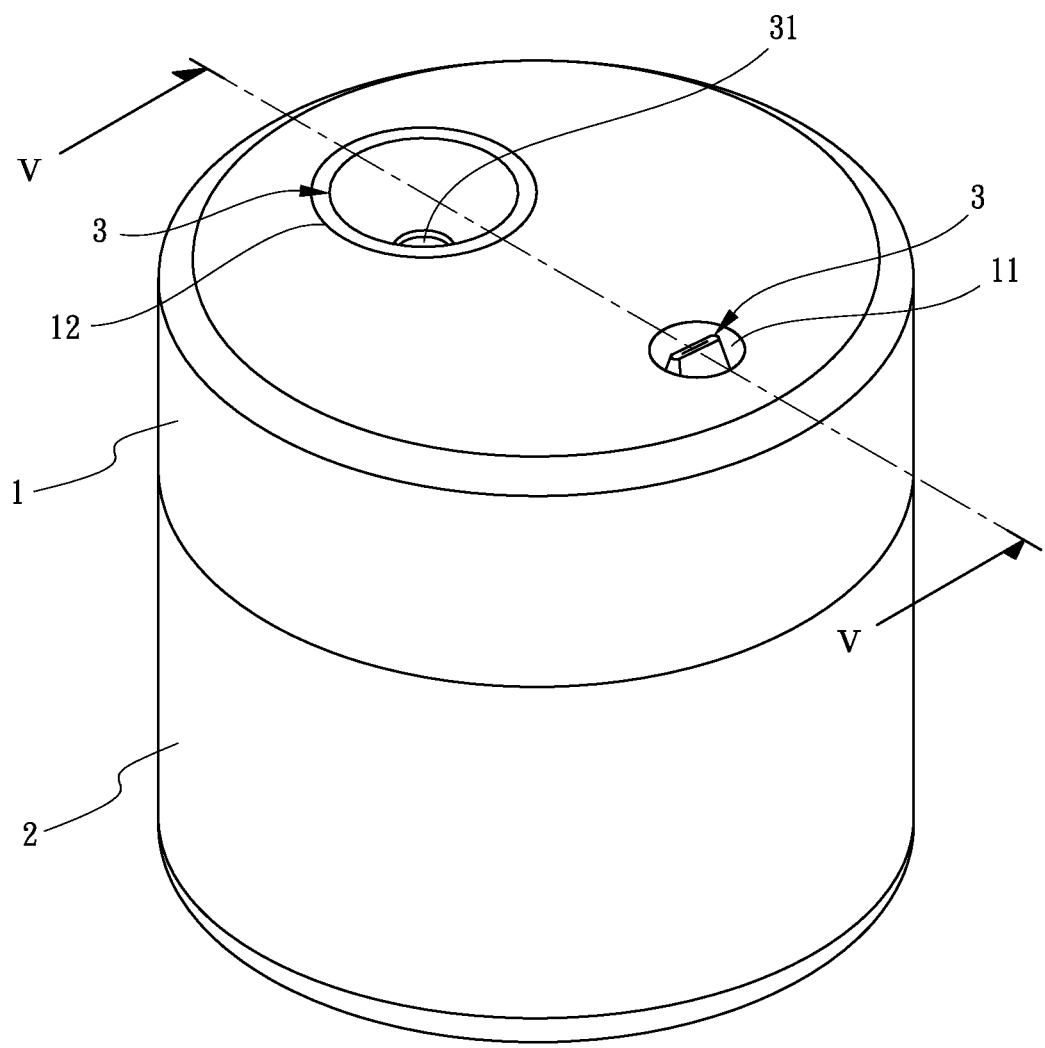
FIG. 2 is a perspective view of the airtight container of the first embodiment.

Referring to FIGS. 1-6, a cover structure for an airtight container in accordance with a first embodiment of the present invention comprises a cover 1, a container 2 and two airtight members 3. The cover 1 is assembled with the container 2. The cover 1 has an exhaust part 11 and a releasing part 12 defined therein. The two airtight members 3 are mounted in the exhaust part 11 and the releasing part 12 respectively. Each airtight member 3 has an inlet 31 and an air gap 32 defined at two ends thereof respectively. The air gap 32 could be in opened or closed state. The air gap 32 communicates with the inlet 31.

Figure 5:
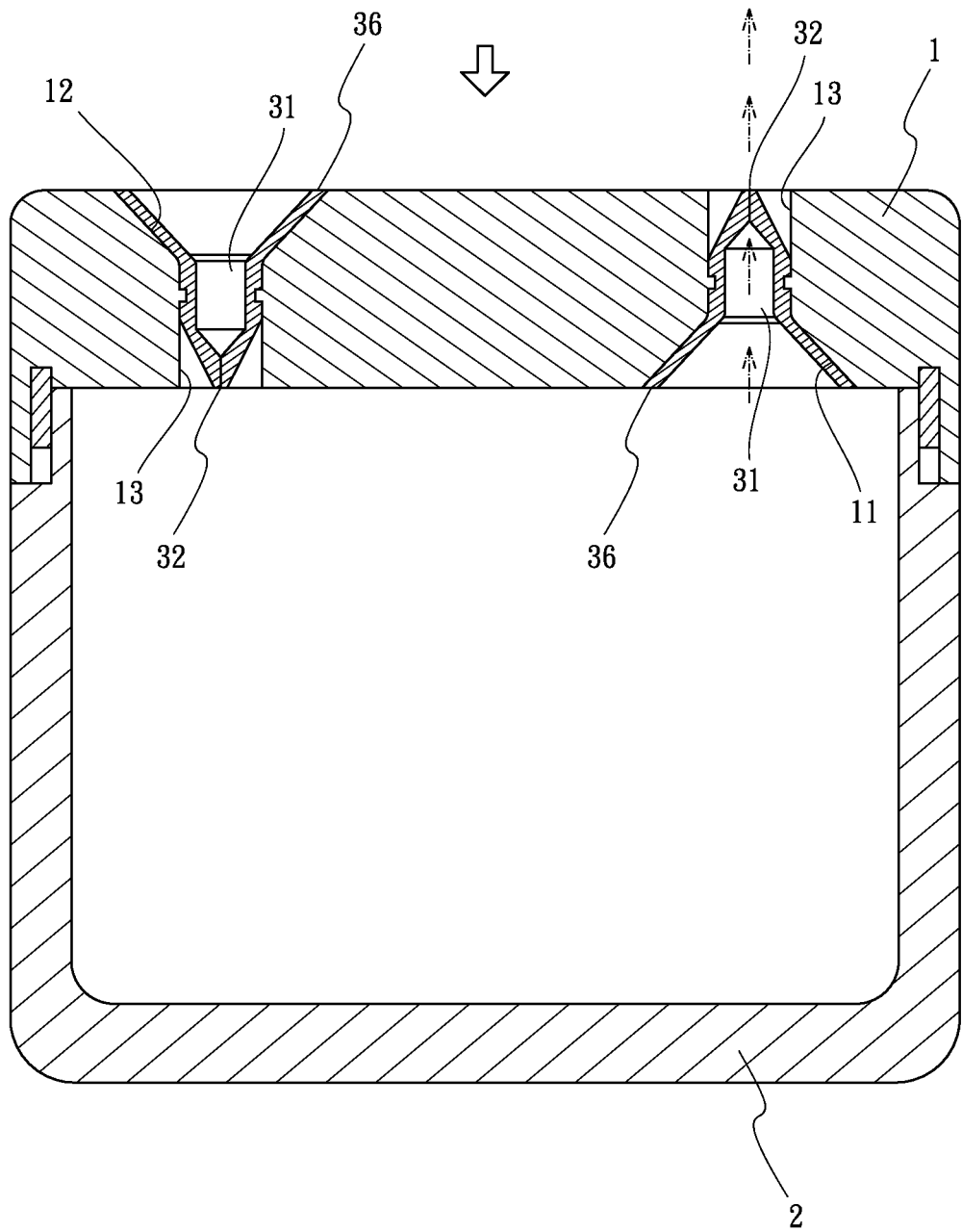
FIG. 5 is a cross-sectional view of the airtight container of the first embodiment along line V-V of FIG. 2.
Figure 6:
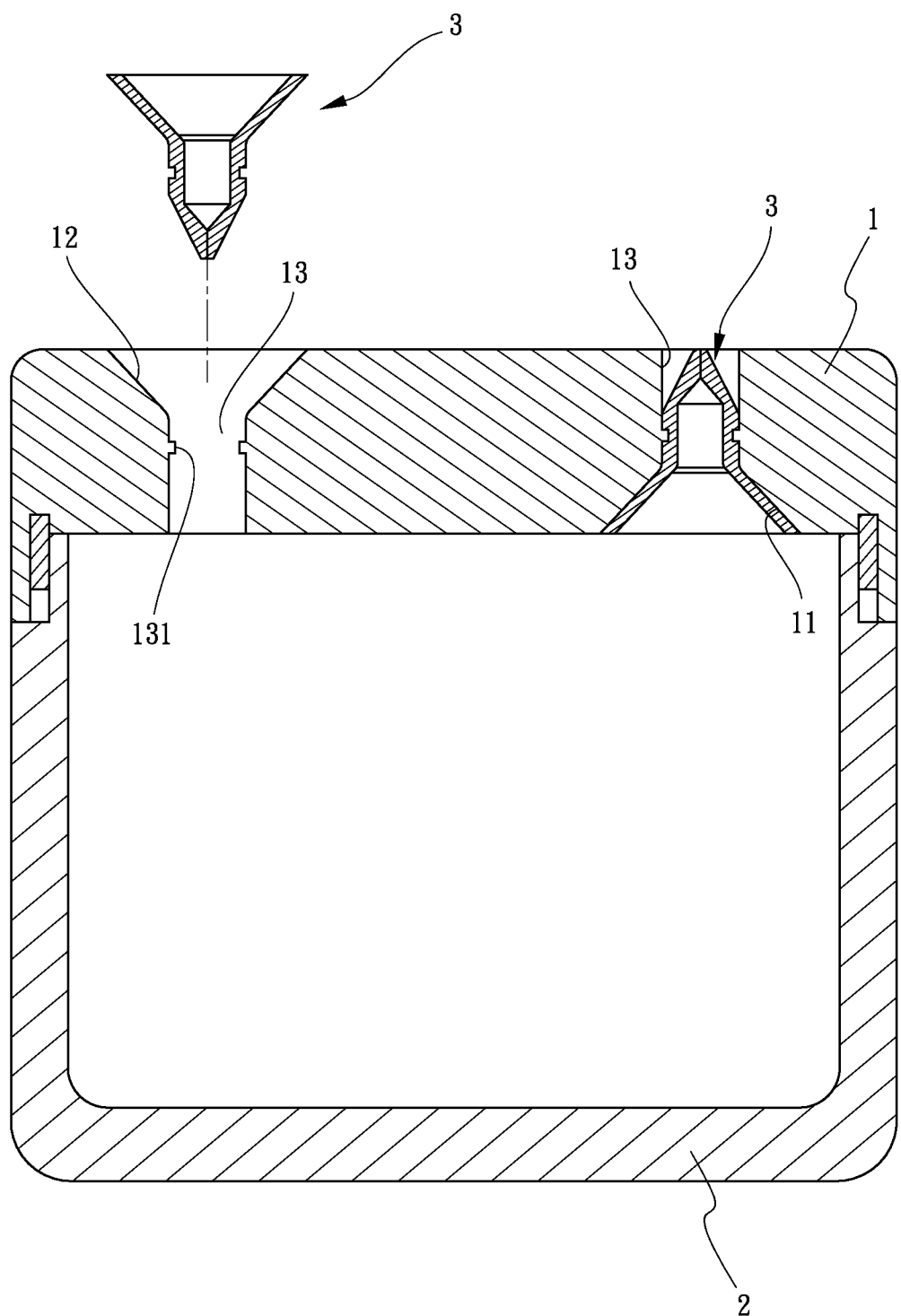
FIG. 6 illustrates that one airtight member of the first embodiment is detached from the airtight container.
Figure 7:
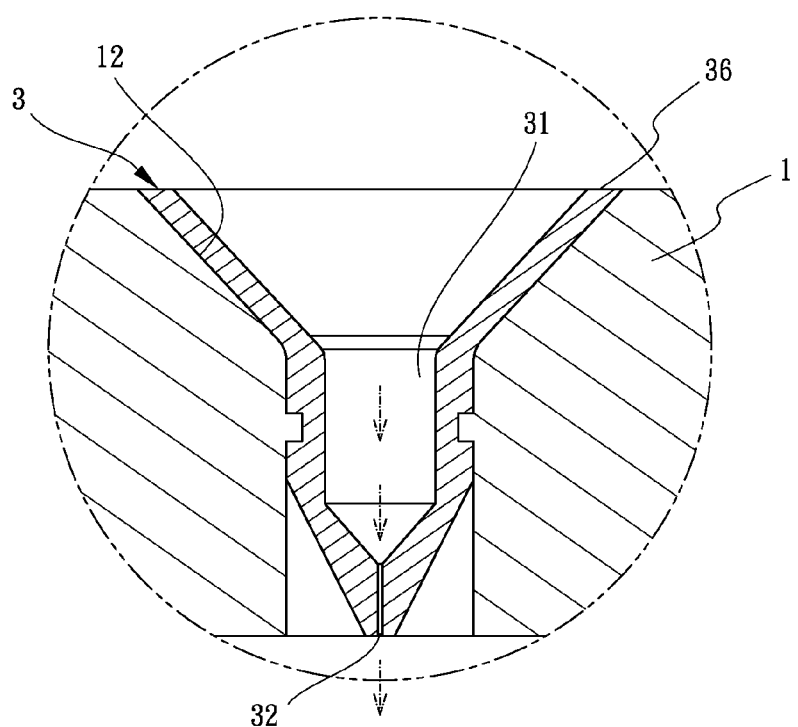
FIG. 7 illustrates that the air flows through the airtight member of a releasing part according to the first embodiment.
Figure 8:
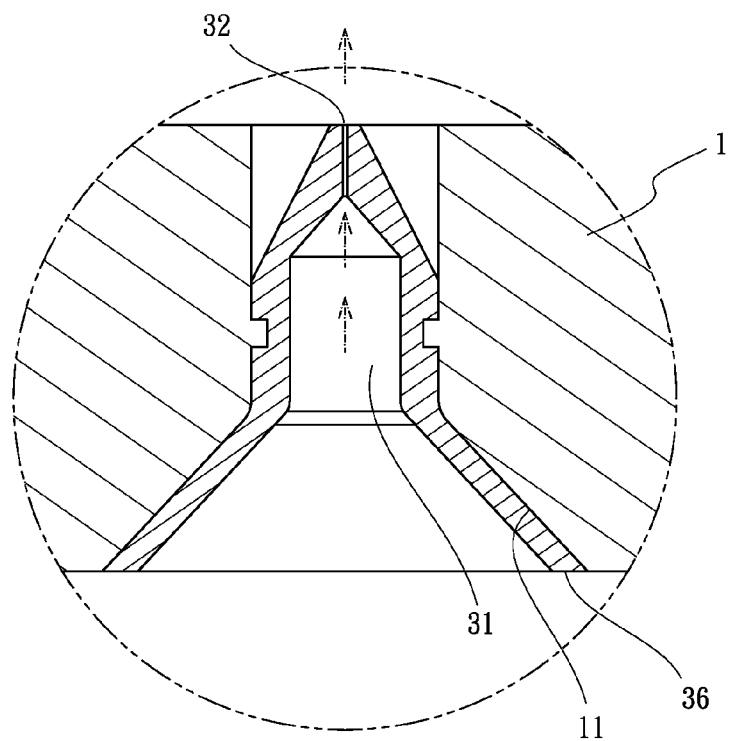
FIG. 8 illustrates that the air flows through the airtight member of an exhaust part according to the first embodiment.

Referring to FIGS. 5-8, one airtight member 3 is received in the exhaust part 11 of the cover 1, wherein the inlet 31 is opened toward an inside of the container 2 and the air gap 32 is opened toward an outside of the container 2; another airtight member 3 is received in the releasing part 12, wherein the inlet 31 is opened toward the outside of the container 2 and the air gap 32 is opened toward the inside of the container 2. The arrows of FIG. 5 and FIGS. 7-8 illustrate the direction of airflow. When the cover 1 is pressed downwardly to cover the container 2 (illustrated by the hollow arrow of FIG. 5), the air in the container 2 is compressed by the cover 1; therefore, the air in the container 2 flows through the inlet 31 of one airtight member 3 disposed in the exhaust part 11 and flows out of the container 2 via the corresponding air gap 32, so that an air pressure inside the container 2 is less than an air pressure outside the container 2 so that the container 2 is sealed.

In contrast, when the cover 1 is detached from the container 2, the outside air flows through the inlet 31 of another airtight member 3 disposed in the releasing part 12 and flows into the container 2 via the corresponding air gap 32, so that the air pressure inside the container 2 is equal to the air pressure outside the container 2, so that the cover 1 is loosened and detached from the container 2. Therefore, the container 2 could be sealed or unsealed just by pressing the cover 1 to the container 2 or detaching the cover 1 from the container 2.

Figure 3:
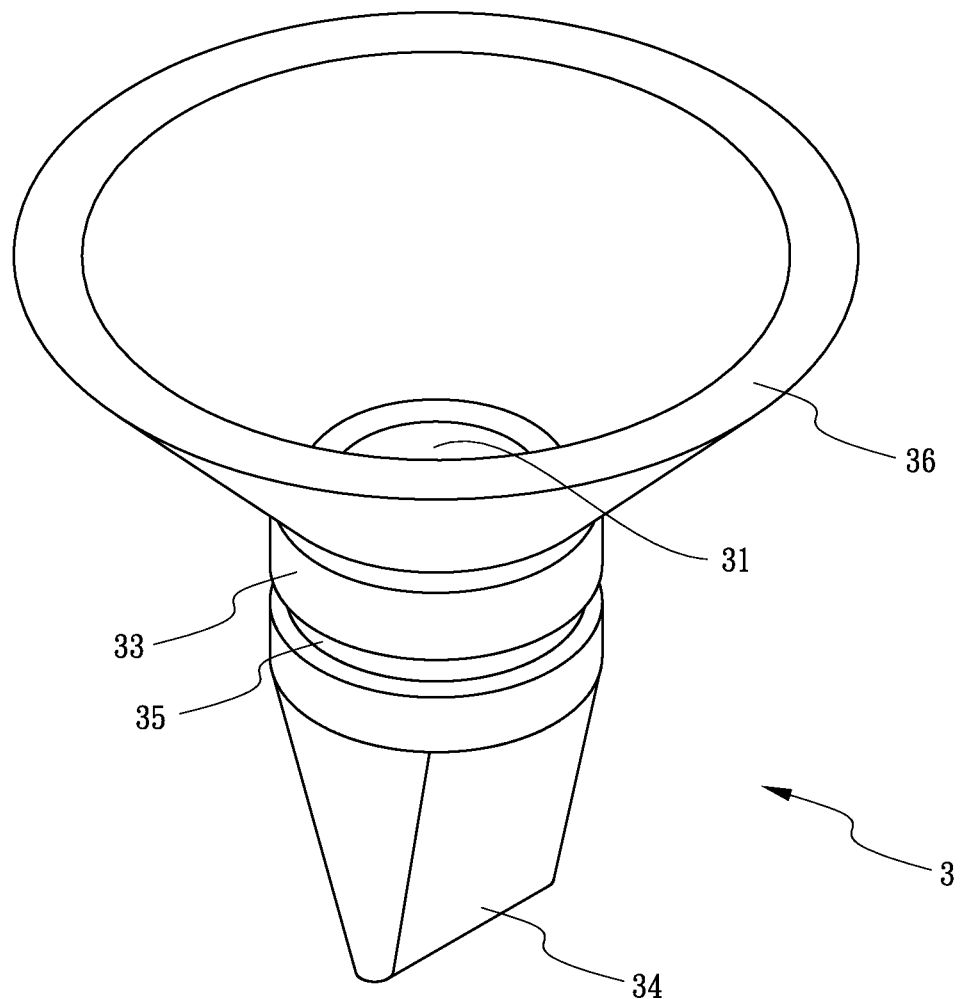
FIG. 3 is a perspective view of all airtight member of FIG. 1.
Figure 4:
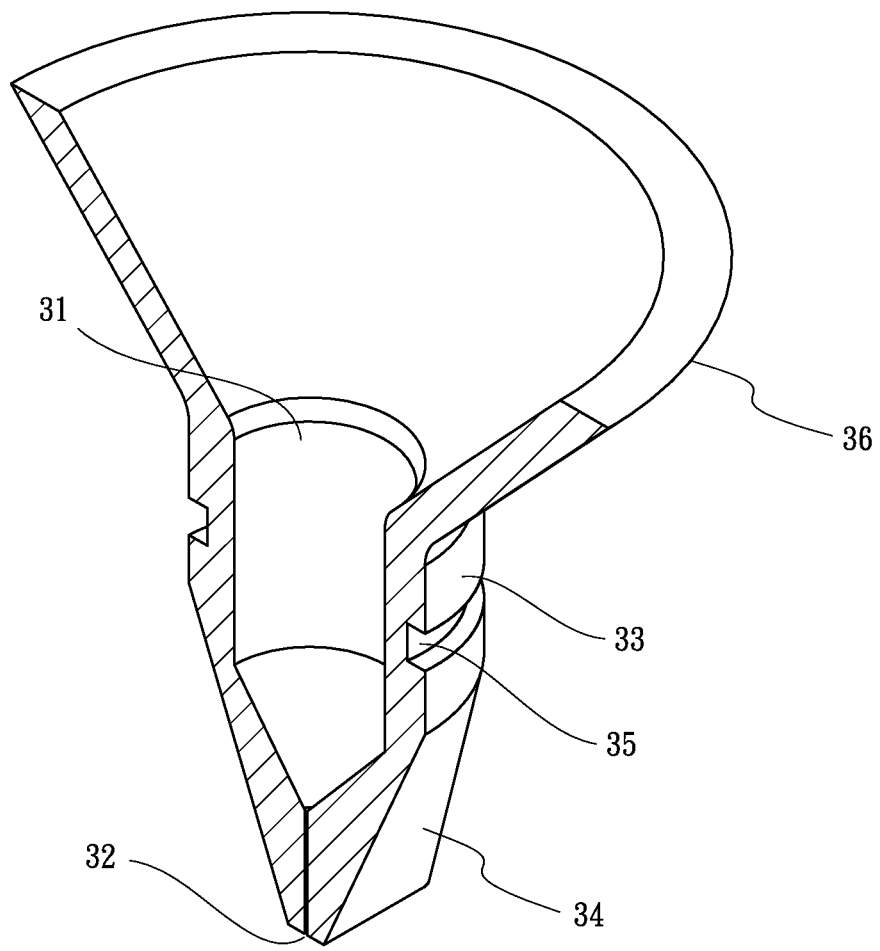
FIG. 4 is a cross-sectional view of FIG. 3.

Referring to FIG. 3, each airtight member 3 has a cylindrical portion 33 and a head portion 34 connected with the cylindrical portion 33. The inlet 31 is defined in the cylindrical portion 33, and the air gap 32 is defined in the head portion 34. The exhaust part 11 and the releasing part 12 of the cover 1 both have an assembling hole 13 defined therethrough. The two airtight members 3 are assembled in the assembling hole 13 of the exhaust part 11 and the assembling hole 13 of the releasing part 12 respectively. The assembling hole 13 has a positioning protrusion 131 defined at an inner periphery thereof. Each airtight member 3 has an insertion groove 35 defined at an outer periphery of the cylindrical portion 33 of each airtight member 3. The insertion groove 35 of each airtight member 3 corresponds to the positioning protrusion 131 of the assembling hole 13 so that each airtight member 3 is positioned in the assembling hole 13. Each airtight member 3 further has an annular portion 36 defined around one end of the cylindrical portion 33 of each airtight member 3.

Furthermore, referring to FIG. 7, the head portion 34 of each airtight member 3 is gradually tapered from the cylindrical portion 33 toward a terminal end thereof. An opening size of the inlet 31 is larger than an opening size of the air gap 32 of each airtight member 3. The inlet 31 of each airtight member 3 is the only way allowed the air flowing through. When the air flows into the inlet 31 of each airtight member 3, the air gap 32 of the head portion 34 is opened by the pressure of the air so that the air could flows through the airtight member 3 via the air gap 32.

Figure 9:
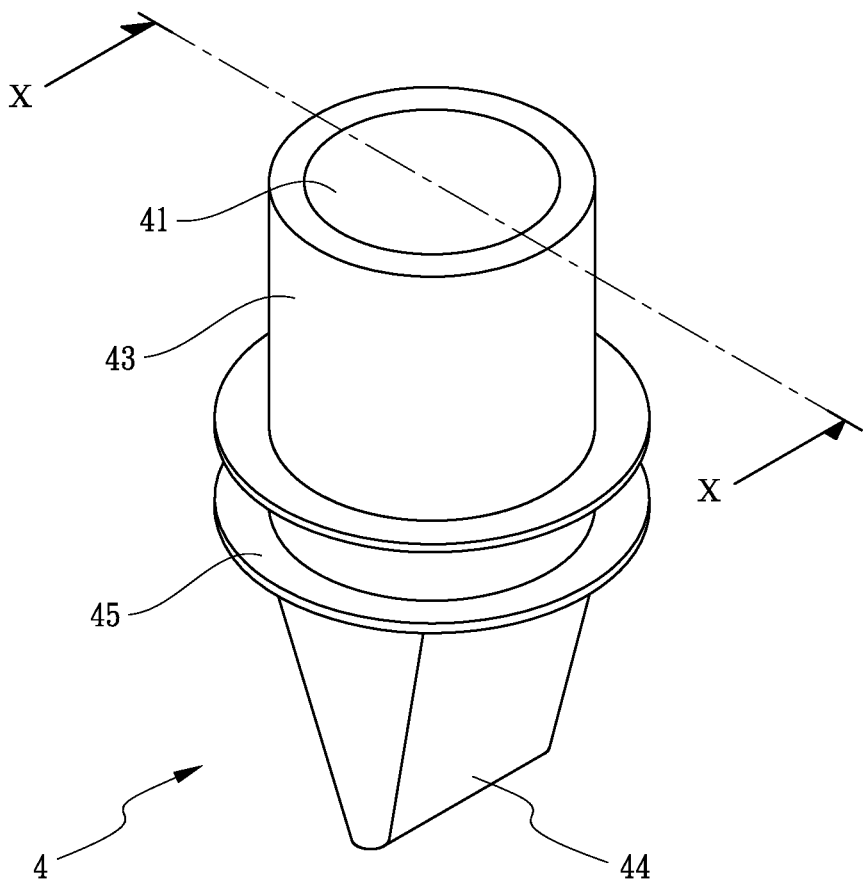
FIG. 9 is a perspective view of an airtight member according to a second embodiment of the present invention.
Figure 10:
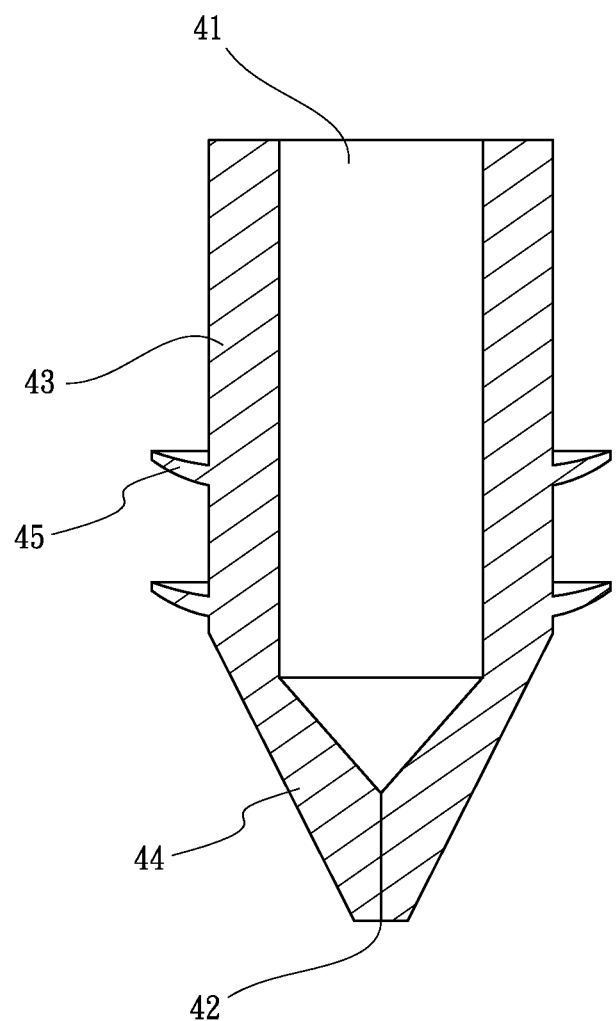
FIG. 10 is a cross-sectional view of the airtight member of the second embodiment along line X-X of FIG. 9.
Figure 11:
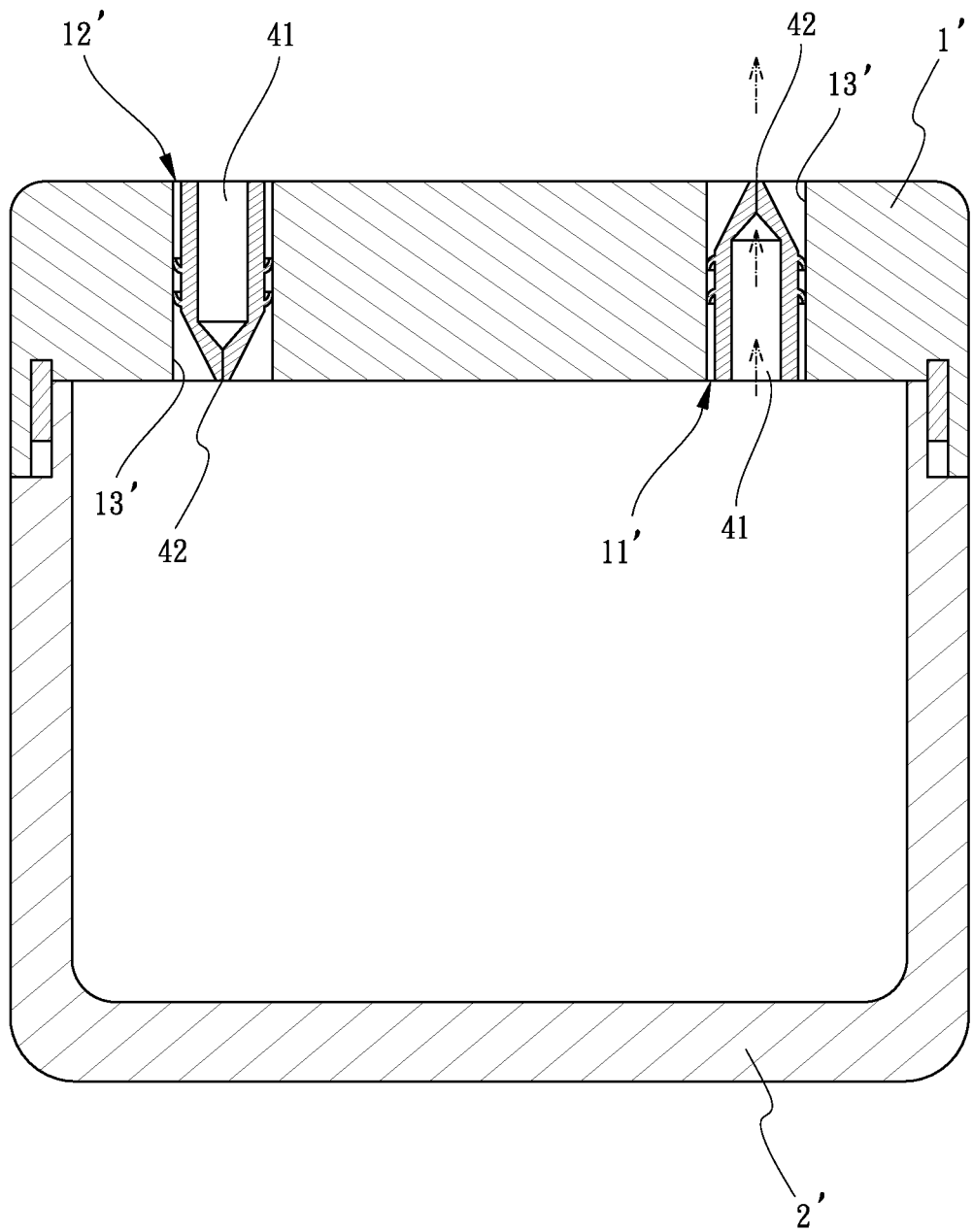
FIG. 11 is a cross-sectional view of an airtight container of the second embodiment.
Figure 12:
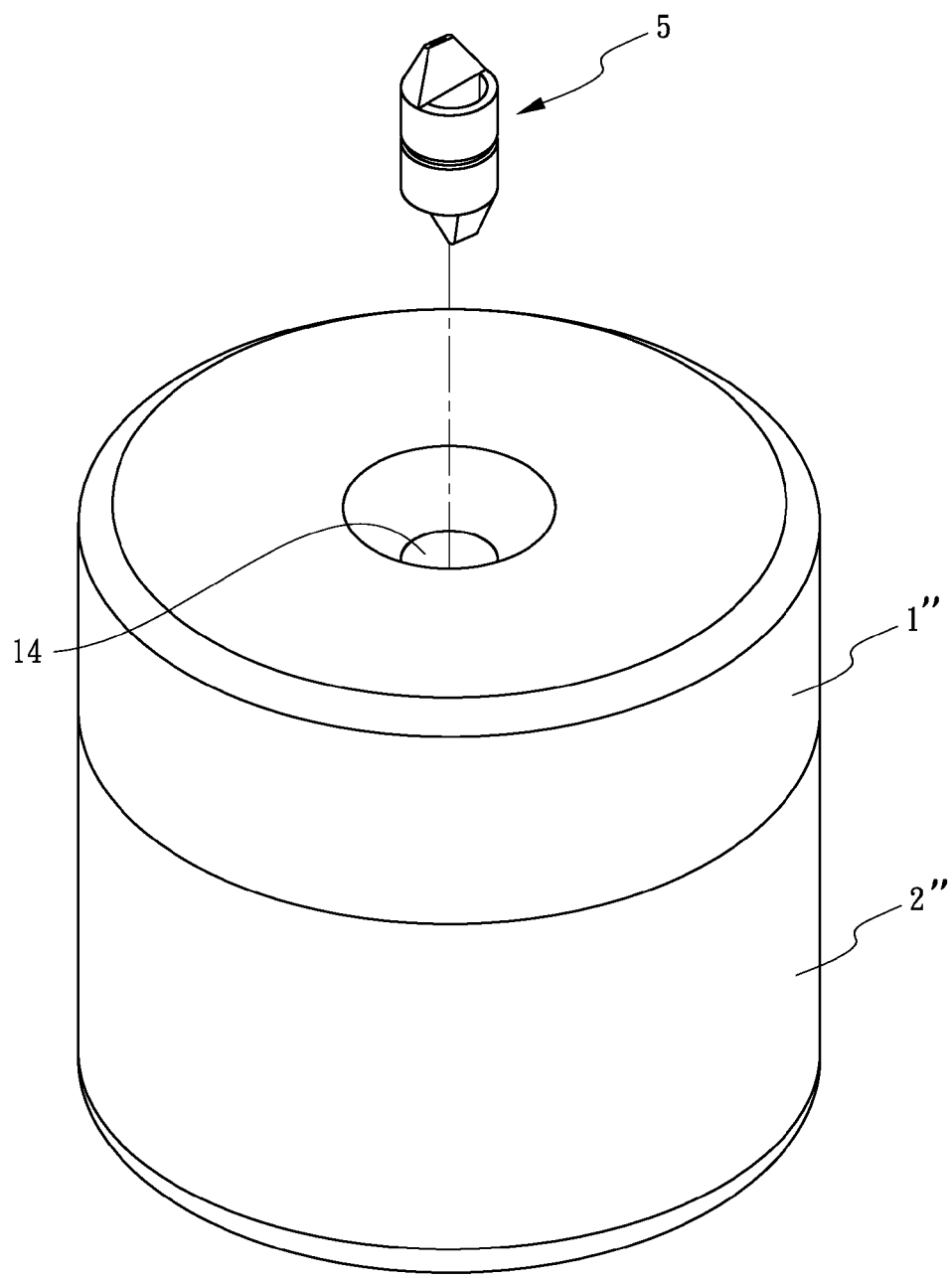
FIG. 12 is an exploded perspective view of an airtight container according to a third embodiment of the present invention.

FIGS. 9-11 show a second embodiment of the cover structure for an airtight container in accordance with the present invention comprises a cover 1' assembled with a container 2' and two airtight members 4. The cover 1' has an exhaust part 11' and a releasing part 12' defined therein. The two airtight members 4 are mounted in the exhaust part 11' and the releasing part 12' respectively. Each airtight member 4 has an inlet 41 and an air gap 42 defined therein. The air gap 42 communicated with the inlet 41. One airtight member 4 is received in the exhaust part 11' and another airtight member 4 is received in the releasing part 12'. Each airtight member 4 has a cylindrical portion 43 and a head portion 44 connected with the cylindrical portion 43. The inlet 41 is defined in the cylindrical portion 43, and the air gap 42 is defined in the head portion 44. The exhaust part 11' and the releasing part 12' of the cover 1' both have an assembling hole 13' defined therethrough. Each airtight member 4 has at least one sealing ring 45 protruded from an outer periphery of the cylindrical portion 43 thereof. The two airtight members 4 are assembled in the assembling hole 13' of the exhaust part 11' and the assembling hole 13' of the releasing part 12' respectively. Specifically, the sealing ring 45 of each airtight member 4 is flexibly abutted against an inner periphery of the respective assembling hole 13' so as to seal the container 2.

FIGS. 12-15 show a third embodiment of the cover structure for an airtight container in accordance with the present invention comprises a cover 1", a container 2" and an airtight member 5. The cover 1" assembled with the container 2". The cover 1" has an assembling hole 14 defined therethrough. The airtight member 5 is assembled in the assembling hole 14 of the cover 1". The airtight member 5 has an exhaust portion 51 and a releasing portion 52 arranged in parallel. The exhaust portion 51 of the airtight member 5 has a first inlet 511 and a first air gap 512 defined at two ends thereof respectively. The first air gap 512 communicates with the first inlet 511. The releasing portion 52 of the airtight member 5 has a second inlet 521 and a second air gap 522 defined at two ends thereof respectively. The second air gap 522 communicates with the second inlet 521. The first inlet 511 is opened toward an inside of the container 2" and the second inlet 521 is opened toward an outside of the container 2" so that the first inlet 511 and the second inlet 521 are located at opposite sides of the airtight member 5.

Figure 13:
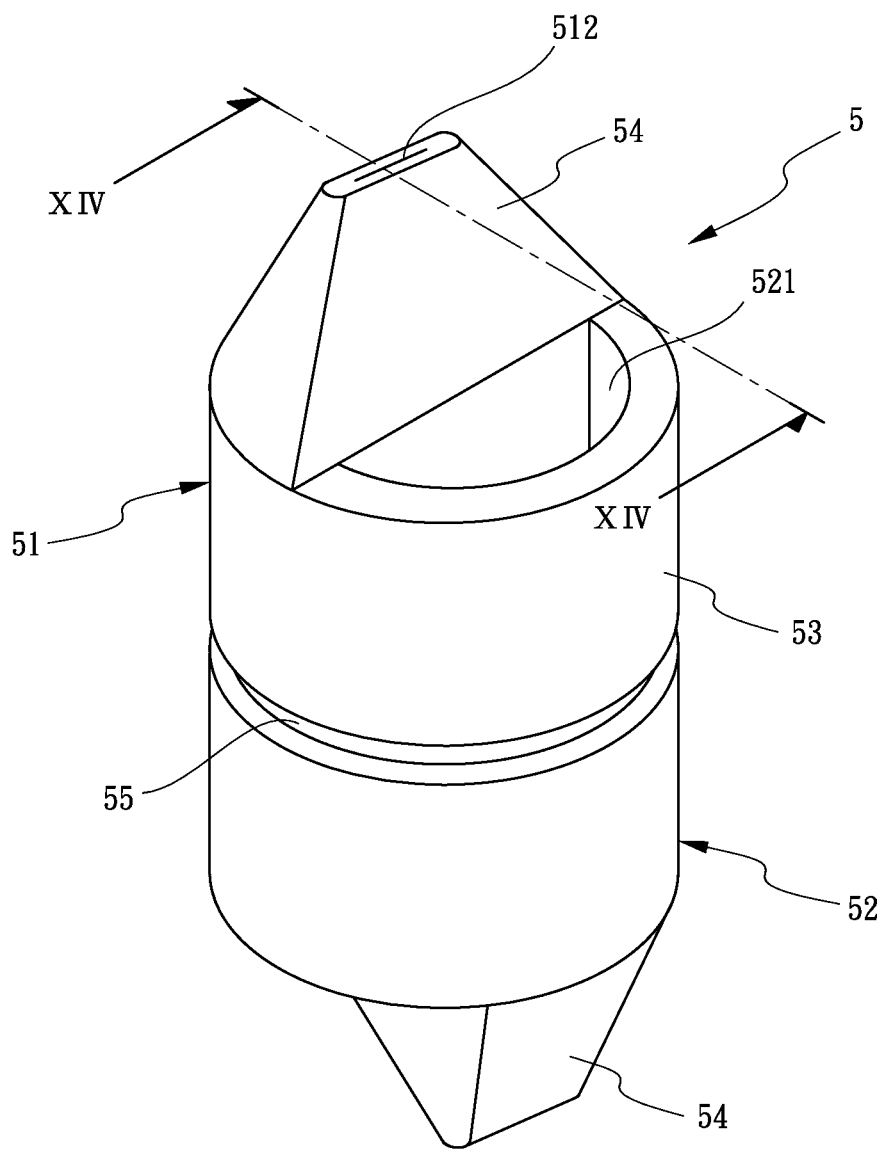
FIG. 13 is a perspective view of an airtight member of the third embodiment.
Figure 14:
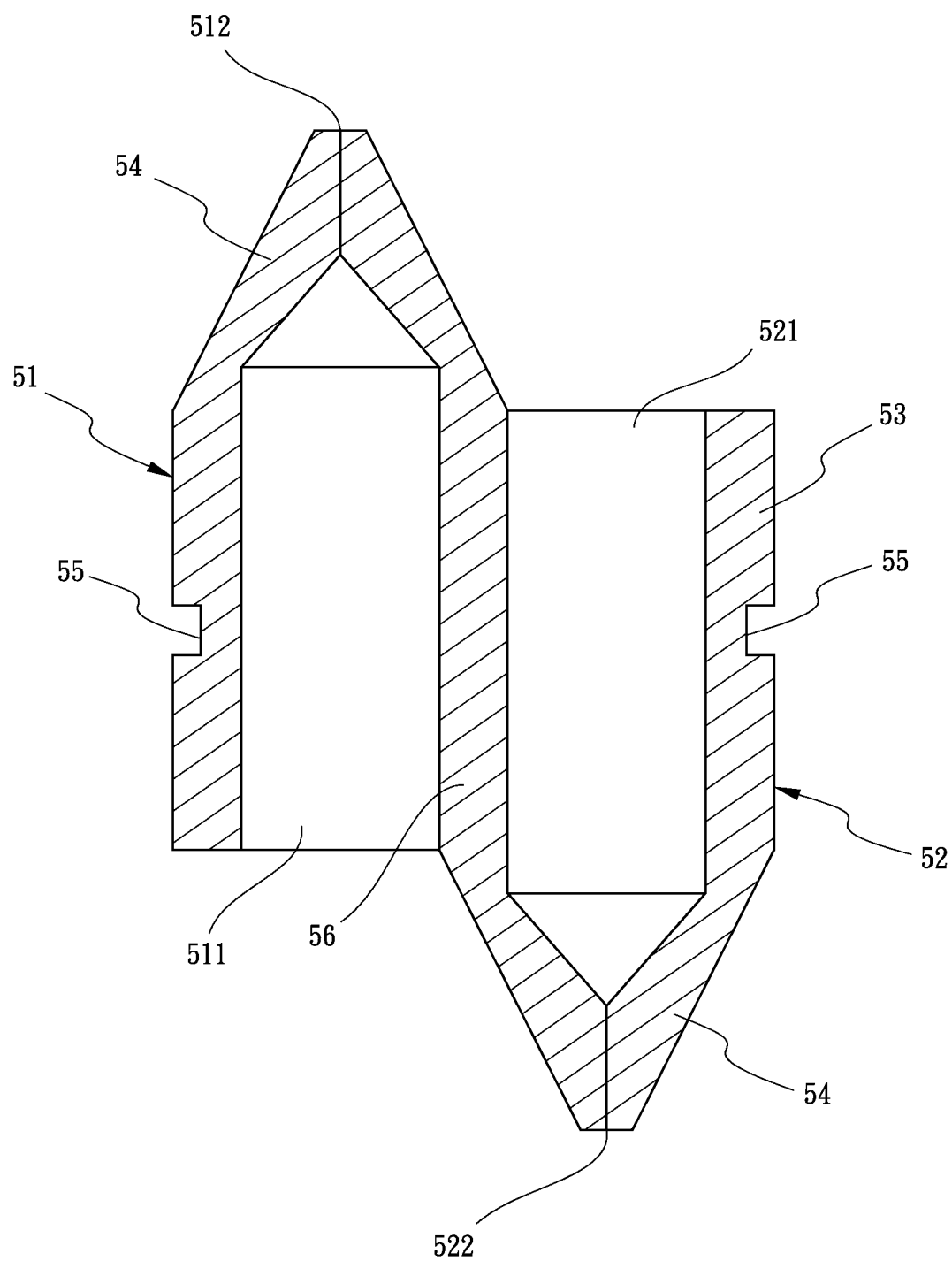
FIG. 14 is a cross-sectional view of the airtight member of the third embodiment along line XIV-XIV of FIG. 13.

Referring to FIGS. 13-14, the airtight member 5 has a cylindrical portion 53 and two head portions 54 respectively connected with two ends of the cylindrical portion 53. The first inlet 511 and the second inlet 521 are disposed at opposite sides of the cylindrical portion 53 respectively. The first inlet 511 and the second inlet 521 are adjacent to the two head portions 54 respectively. The first air gap 512 and the second air gap 522 are disposed at terminal ends of the two head portions 54 respectively. Each head potion 54 of the airtight member 5 is gradually tapered from the cylindrical portion 53 toward the terminal end thereof. Furthermore, an opening size of the first inlet 511 is larger than an opening size of the first air gap 512 of the exhaust portion 51, and an opening size of the second inlet 521 is larger than an opening size of the second air gap 522 of the releasing portion 52.

Figure 15:
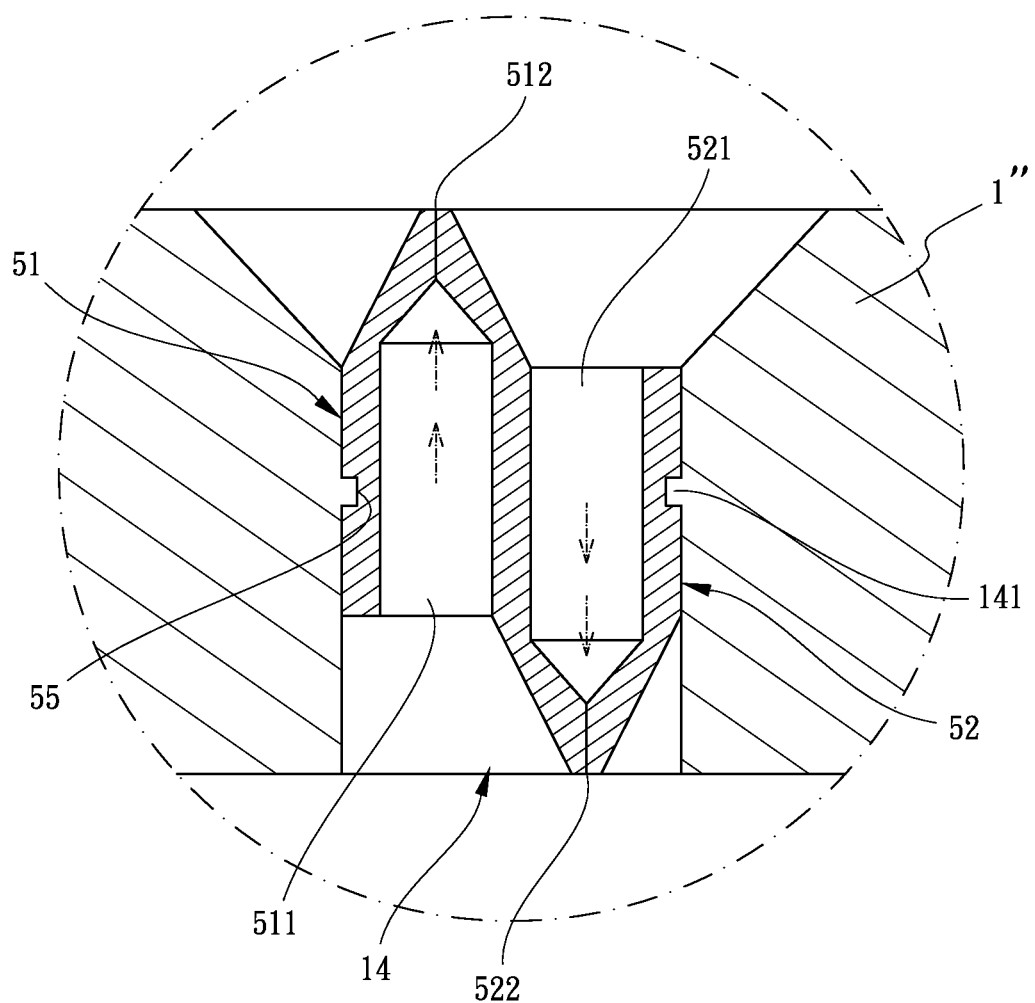
FIG. 15 illustrates that the air flows through the airtight member of the third embodiment.

Referring to FIG. 15, the assembling hole 14 has a positioning protrusion 141 protruded from an inner periphery thereof. The airtight member 5 has an insertion groove 55 defined at an outer periphery of the cylindrical portion 53 of the airtight member 5. The insertion groove 55 of the airtight member 5 corresponds to the positioning protrusion 141 of the assembling hole 14. Therefore, when the airtight member 5 is inserted into the assembling hole 14, the positioning protrusion 141 is engaged with the insertion groove 55 of the airtight member 5 so that the airtight member 5 is positioned in the assembling hole 14. In addition, a partition wall 56 is defined between the exhaust portion 51 and the releasing portion 52 so as to separate the exhaust portion 51 and the releasing portion 52, as shown in FIG. 14.

Under this arrangement, when the cover 1" is pressed downwardly to cover the container 2", the air in the container 2" is compressed by the cover 1"; therefore, the air in the container 2" flows through the first inlet 511 of the exhaust part 51 and flows out via the first air gap 512, so that an air pressure inside the container 2" is less than an air pressure outside the container 2" so that the container 2" is sealed.

In contrast, when the cover 1" is detached from the container 2", the outside air flows through the second inlet 521 of the releasing part 52 and flows into the container 2" via the second air gap 522, so that the air pressure inside the container 2" is equal to the air pressure outside the container 2", so that the cover 1" is loosened and detached from the container 2". Therefore, the container 2" could be sealed or unsealed just by pressing the cover 1" to the container 2" or detaching the cover 1" from the container 2.

Although the invention has been explained in relation to its preferred embodiment, it is to be understood that many other possible modifications and variations can be made without departing from the scope of the invention as hereinafter claimed.

What is claimed is:

1. An airtight container comprising:
   a container;
   a cover assembled with the container, the cover having an exhaust part and a releasing part defined therein; and
   two airtight members mounted in the exhaust part and the releasing part of the cover respectively, each airtight member having an inlet and an air gap defined at two ends thereof respectively, the air gap communicating with the inlet, the inlet of one airtight member opened toward an inside of the container and the air gap opened toward an outside of the container, the inlet of another airtight member opened toward the outside of the container and the air gap opened toward the inside of the container, each airtight member having a cylindrical portion, a head portion and an annular portion, the head portion and the annular portion respectively connected to two ends of the cylindrical portion; the annular portion defined around one end of the cylindrical portion of each airtight member; the inlet defined in the cylindrical portion and communicating with the annular portion, the air gap defined in the head portion; the head portion of each airtight member being gradually tapered from the cylindrical portion toward a terminal end thereof; an opening size of the inlet being larger than an opening size of the air gap of each airtight member; the exhaust part and the releasing part of the cover both having an assembling hole defined therethrough; the two airtight members assembled in the assembling hole of the exhaust part and the assembling hole of the releasing part respectively, the cylindrical portion of each airtight member being in contact with an inner periphery of each of the assembling holes, a positioning protrusion defined at the inner periphery of each of the assembling holes; each airtight member having an insertion groove defined at an outer periphery of the cylindrical portion thereof; the positioning protrusion of the assembling hole engaged with the insertion groove of each airtight member so that each airtight member is positioned in the assembling hole.

2. The airtight container as claimed in claim 1, wherein each airtight member has at least one sealing ring protruded from an outer periphery of the cylindrical portion thereof; the sealing ring of each airtight member is flexibly abutted against an inner periphery of the respective assembling hole.

* * * * *